United States Patent
Banasky et al.

(10) Patent No.: US 9,469,364 B2
(45) Date of Patent: Oct. 18, 2016

(54) FOLDABLE ELECTRIC BICYCLE

(71) Applicant: Ford Global Technologies, LLC, Dearborn, MI (US)

(72) Inventors: Lawrence Banasky, Livonia, MI (US); Mark Wisnewski, Stockbridge, MI (US); Morris Donald, Westland, MI (US); Mark Viergutz, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 98 days.

(21) Appl. No.: 14/317,186

(22) Filed: Jun. 27, 2014

(65) Prior Publication Data

US 2015/0375820 A1   Dec. 31, 2015

(51) Int. Cl.
*B62K 15/00* (2006.01)
*B62M 6/60* (2010.01)

(52) U.S. Cl.
CPC ............ *B62K 15/006* (2013.01); *B62M 6/60* (2013.01)

(58) Field of Classification Search
CPC ............ B62K 15/006; B62K 15/008; B62K 2204/00; B62M 6/60; B62M 7/12
USPC ................................................. 280/278, 287
See application file for complete search history.

(56) References Cited

U.S. PATENT DOCUMENTS

| 6,267,401 B1 * | 7/2001 | De Jong | B62K 15/008 280/287 |
| 6,979,013 B2 | 12/2005 | Chen | |
| 8,523,212 B2 * | 9/2013 | Ryan | B62K 15/008 180/206.1 |
| 8,801,022 B2 * | 8/2014 | Song | B62K 15/006 280/278 |
| 2013/0277941 A1 | 10/2013 | Ryan et al. | |
| 2014/0076649 A1 * | 3/2014 | Kim | B62K 15/008 180/220 |

FOREIGN PATENT DOCUMENTS

| CN | 2825435 Y | 10/2006 | |
| CN | 102431383 A | 5/2012 | |
| CN | 202574557 U | 12/2012 | |
| EP | 2176117 B1 | 3/2011 | |
| GB | 2414972 | * 11/2004 | |
| WO | 2006131742 A1 | 12/2006 | |
| WO | 2010127456 A1 | 11/2010 | |
| WO | 2011107232 A1 | 9/2011 | |
| WO | 2015/011385 | * 1/2015 | ............... B62K 3/10 |

* cited by examiner

*Primary Examiner* — Anne Marie Boehler
(74) *Attorney, Agent, or Firm* — Frank A. MacKenzie; Bejin Bieneman PLC

(57) ABSTRACT

A foldable bicycle includes a frame, a front wheel assembly, and a rear wheel assembly. The frame defines a pivot axis. The front wheel assembly is disposed on the frame and configured to rotate about the pivot axis. The rear wheel assembly is disposed on the frame and defines an opening for receiving the front wheel assembly when the bicycle is folded.

15 Claims, 3 Drawing Sheets

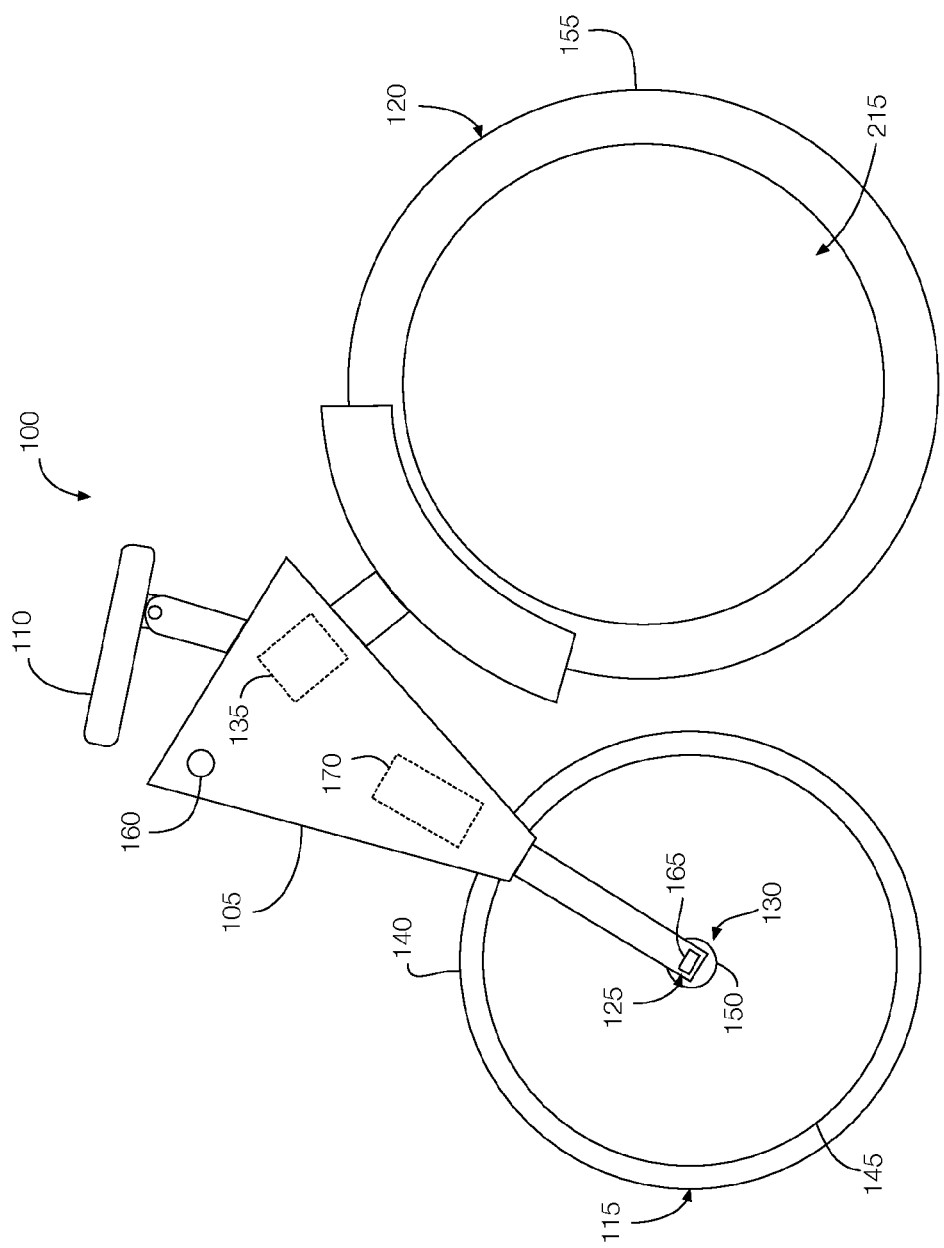

US 9,469,364 B2

FOLDABLE ELECTRIC BICYCLE

BACKGROUND

Bicycles are hard to transport with passenger vehicles, especially cars. Bicycles do not fit in the trunks of most vehicles unless the bicycle is disassembled. Reassembling a bicycle can take significant time, however. A common solution is to put the bicycle on a bike rack that attaches to the vehicle. Bike racks usually rest on the roof or trunk of the vehicle. Some bike racks attach to a trailer hitch. Even bike racks have drawbacks, however. For example, bike racks that attach to the trunk or trailer hitch often limit access to the trunk or cargo space.

BRIEF DESCRIPTION OF THE DRAWINGS

FIG. 1 illustrates an example foldable electric bicycle.

DETAILED DESCRIPTION

Figure 2A:
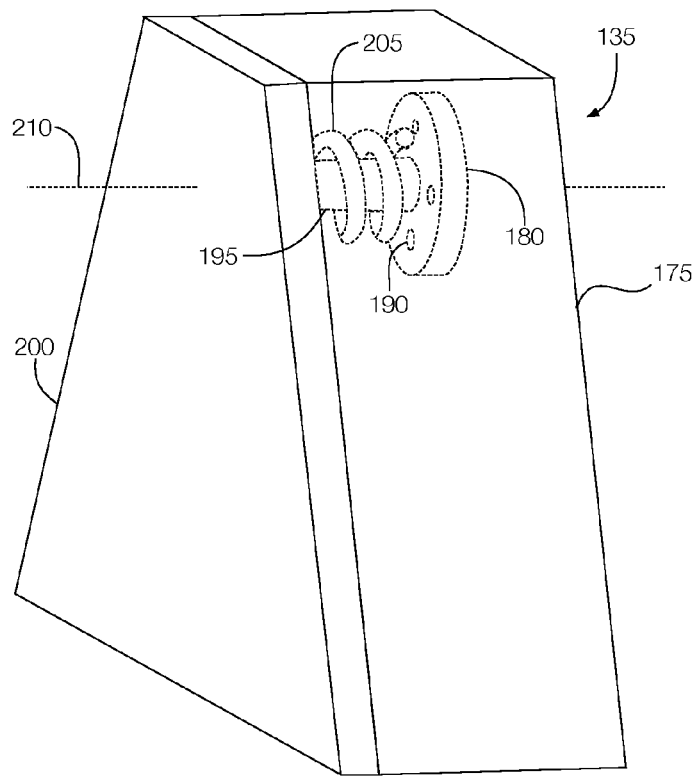
FIGS. 2A and 2B illustrate an example locking mechanism that may be used with the bicycle of FIG. 1.

Folding bicycles can be transported with passenger vehicles without having to disassemble the bicycle or put the bicycle on a bike rack. An example foldable bicycle includes a frame with a pivot and locking mechanism. The pivot and locking mechanism has a pivot housing and a locking housing. The pivot housing defines a pivot axis and the locking housing is configured to lock the frame into a folded position and an unfolded position. The bicycle further includes front and rear wheel assemblies. The front wheel assembly is configured to rotate about the pivot axis. The rear wheel assembly defines an opening having a diameter larger than an outer diameter of the front wheel assembly. Therefore, when the bicycle is in the folded position, the opening in the rear wheel assembly may receive the front wheel assembly, giving the bicycle a smaller footprint and making the bicycle easier to transport.

The bicycle and its elements shown in the FIGS. may take many different forms and include multiple and/or alternate components and facilities. The exemplary components illustrated are not intended to be limiting. Indeed, additional or alternative components and/or implementations may be used.

FIG. 1 illustrates a bicycle 100 that can be folded to fit in a cargo space of a vehicle, such as a car, truck, sport utility vehicle, van, minivan, or the like. The bicycle 100, as shown, includes a frame 105, a seat 110 disposed on the frame 105, a front wheel assembly 115, a rear wheel assembly 120, a steering system 125, and a drive system 130.

The frame 105 may support several components of the bicycle 100. For instance, the front and rear wheel assemblies 115, 120 may be disposed on the frame 105. Moreover, the frame 105 may further include a pivot and locking mechanism 135, discussed in greater detail below with reference to FIGS. 2A and 2B. The pivot and locking mechanism 135 may define a pivot axis 210 for folding the bicycle 100. Further, the pivot and locking mechanism 135 may lock the bicycle 100 in the folded position, the unfolded position, or both.

The front wheel assembly 115 may include a front wheel 140, a hub 145 disposed within the front wheel 140, and a motor 150 operably connected to the hub 145. The motor 150 may be configured to receive electrical power and output a torque in accordance with the electrical power received. The torque generated by the motor 150 may drive the front wheel 140. Accordingly, the front wheel 140 may rotate in accordance with the rotation of the motor 150. The front wheel assembly 115 may be disposed on the frame 105.

The rear wheel assembly 120 may include a spokeless rear wheel 155 rotatably connected to the frame 105. The rear wheel 155 may define an opening 215 configured to receive the front wheel assembly 115 when the bicycle 100 is in the folded position (e.g., when the front wheel assembly 115 is rotated about the pivot axis 210). The diameter of the opening 215, therefore, may be larger than an outer diameter of the front wheel 140.

The steering system 125 may be configured to help a rider steer the bicycle 100. The steering system 125 may include handlebars 160, footrests 165, or both. The handlebars 160 may be disposed on the frame 105 near the seat 110. During use, the rider may grip the handlebars 160 while seated. The handlebars 160 may include controls for receiving commands, inputs, or both, associated with the operation of the bicycle 100. Therefore, the handlebars 160 may permit the rider to adjust the speed of the bicycle 100 or provide inputs to various systems such as a navigation system, an infotainment system, etc. In addition or in the alternative, the handlebars 160 may help steady the rider on the bicycle 100. The footrests 165 may further support the rider. When not in use, the footrests 165 may be configured to fold toward the front wheel assembly 115. The bicycle 100 may be steered by the rider manipulating the handlebars 160 or footrests 165, or by leaning in a certain direction. In some instances, one or more gyroscopes may detect whether the rider is leaning. The gyroscope measurements may prompt the system to command the front wheel assembly 115 to turn in the direction in which the rider is leaning and adjust the speed of the motor 150 to assist with balance. The gyroscopes may be disposed in the frame 105.

The drive system 130 may be configured to power the bicycle 100. For instance, the drive system 130 may include a rechargeable battery 170 disposed in the frame 105. Plugging the battery 170 into a power source, such as a wall outlet, may recharge the battery 170. Alternatively or in addition, the drive system 130 may incorporate a regenerative braking technique to help charge the battery 170.

The bicycle 100 may incorporate other features such as a navigation system and an infotainment system.

The navigation system may be configured to determine a position of the bicycle 100 using, e.g., a Global Positioning System (GPS) receiver that is able to triangulate the position of the bicycle 100 relative to satellites or terrestrial based transmitter towers. The navigation system may be further configured to develop routes from the current location to a selected destination, as well as display a map and present driving directions to the selected destination via, e.g., a user interface device.

The infotainment system may be configured to provide the rider with information related to the operation of the bicycle 100. Such information may include a distance traveled, the amount of battery charge remaining, bicycle 100 speed, or the like. The infotainment system may also be configured to communicate with a rider's mobile device, such as a cell phone. For example, the infotainment system and the mobile device may pair with one another using a protocol such as, e.g., Bluetooth®. While paired, the mobile device and infotainment system may exchange information. In some possible approaches, the infotainment system includes an input device, an output device, or both. For instance, the infotainment system may include a touch sensitive display screen configured to receive user inputs and present information to the user.

Figure 2B:
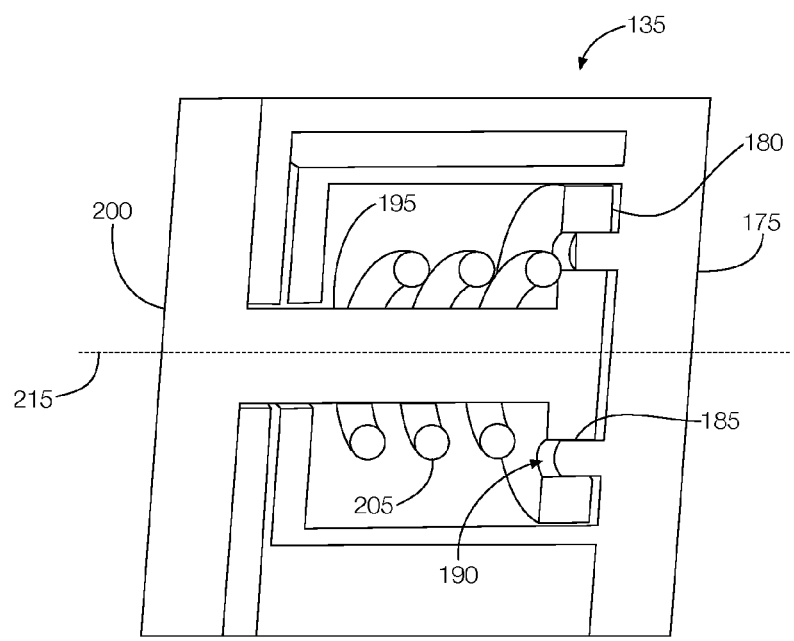

FIGS. 2A and 2B illustrate an example pivot and locking mechanism 135. FIG. 2B is a cross-sectional view of the pivot and locking mechanism of FIG. 2A. As illustrated, the pivot and locking mechanism 135 includes a locking housing 175 configured to receive a base 180. For example, the locking housing 175 may include pins 185 configured to engage holes 190 defined by the base 180. A shaft 195 may be disposed on or integrally formed with the base 180 at one end. At another end, the shaft 195 may be disposed on or integrally formed with a pivot housing 200. The shaft 195, therefore, may extend from the pivot housing 200 into the locking housing 175. A spring 205 may be configured to bias the base 180 toward the locking housing 175. Specifically, the spring 205 may keep the base 180 engaged with the pins 185 of the locking housing 175. As shown, the spring 205 is aligned with the shaft 195. Alternatively, the spring 205 may be disposed substantially parallel to the shaft 195.

To move the bicycle 100 from the unfolded position to the folded position, and vice versa, the base 180 must be disengaged from the pins 185. One way to disengage the base 180 from the pins 185 may include counteracting the force of the spring 205. For instance, a rider or other person could pull the pivot housing 200 away from the locking housing 175, causing the spring 205 to compress and the base 180 to disengage the pins 185. The pivot housing 200 may be rotated about, e.g., an axis 210 defined by the shaft 195. Once the bicycle 100 is in the new position (i.e., the folded or unfolded position), releasing the pivot housing 200 will cause the spring 205 to push the base 180 back into engagement with the pins 185.

Figure 3A:
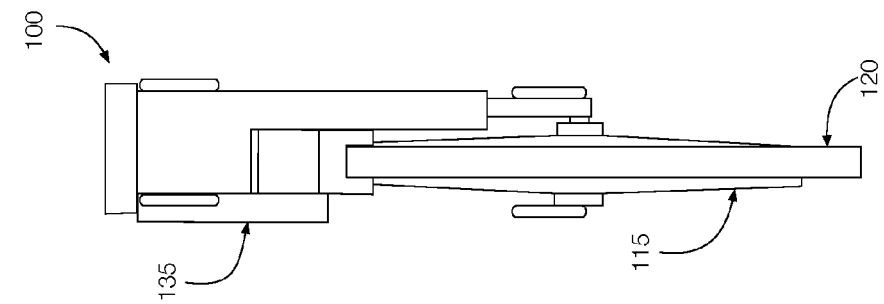
FIGS. 3A-3C illustrate front views of the bicycle when in a folded, partially folded, and unfolded position.
Figure 3B:
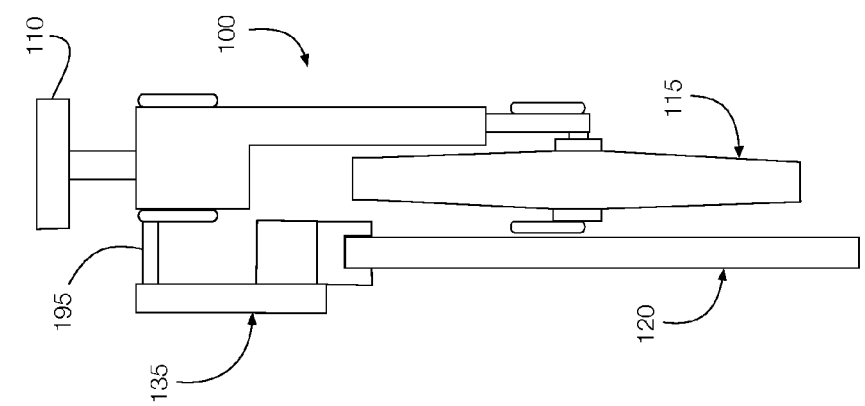
Figure 3C:
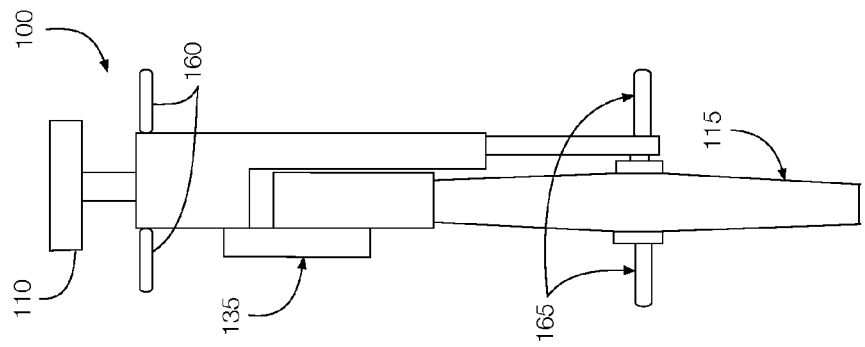

FIGS. 3A-3C illustrate front views of the bicycle 100 as it moves from the folded position to the unfolded position.

In FIG. 3A, the front wheel assembly 115 is disposed within the rear wheel assembly 120. Although not viewable in FIG. 3A, the spring 205 is biasing the base 180 toward the pins 185 in the locking housing 175. Moreover, the footrests 165 are folded toward the front wheel assembly 115 while the bicycle 100 is in the folded position. In the folded position, the bicycle 100 has a relatively flat profile, making the bicycle 100 easy to transport in a vehicle. The small footprint allows the bicycle 100 to be easily stowed in a trunk, in or behind a back seat, or on the roof of a vehicle.

FIG. 3B illustrates the front view after the pivot housing 200 is pulled away from the locking housing 175. Pulling the pivot housing 200 compresses the spring 205 and releases the base 180 from the pins 185. The frame 105 is now free to rotate about the axis 210 defined by the shaft 195.

FIG. 3C illustrates an example front view of the bicycle 100 in the unfolded position. The pivot and locking mechanism 135 keeps the bicycle 100 in the unfolded position. That is, the spring 205 pushes the pivot housing 200 toward the locking housing 175, causing the base 180 to engage the pins 185. The bicycle 100 cannot be moved out of the unfolded position until the pins 185 are disengaged.

In general, the computing systems and/or devices discussed above may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A foldable bicycle comprising:
    a frame defining a pivot axis and a pivot and locking mechanism that includes a base, a locking housing that receives the base, and a pivot housing;
    a front wheel assembly disposed on the frame and configured to rotate about the pivot axis; and
    a rear wheel assembly disposed on the frame and defining an opening,
    wherein the front wheel assembly is disposed within the opening defined by the rear wheel assembly when the bicycle is in a folded position,
    wherein the pivot housing and the base engage the locking housing when the bicycle is in the folded position and in an unfolded position,
    wherein the base defines holes and wherein the locking housing includes pins configured to engage the holes of the base.

2. The foldable bicycle of claim 1, wherein the pivot axis is defined by the pivot and locking mechanism.

3. The foldable bicycle of claim 1, wherein the pivot and locking mechanism is configured to lock the bicycle in at least one of the folded position and the unfolded position.

4. The foldable bicycle of claim 1, wherein the pivot and locking mechanism includes a shaft disposed on the base.

5. The foldable bicycle of claim 4, wherein the shaft extends from the pivot housing and into the locking housing.

6. The foldable bicycle of claim 4, wherein the pivot and locking mechanism includes a spring configured to bias the base toward the locking housing.

7. The foldable bicycle of claim 6, wherein the spring is coaxially aligned with the shaft.

8. The foldable bicycle of claim 6, wherein the spring is substantially parallel to the shaft.

9. The foldable bicycle of claim 1, wherein the front wheel assembly includes:
    a front wheel;
    a hub disposed within the front wheel; and
    a motor operably connected to the hub.

10. The foldable bicycle of claim 9, wherein a diameter of the opening defined by the rear wheel assembly is larger than an outer diameter of the front wheel.

11. The foldable bicycle of claim 1, wherein the rear wheel assembly includes a spokeless rear wheel rotatably connected to the frame, wherein the opening is defined by the rear wheel.

12. A foldable bicycle comprising:
    a frame having a pivot and locking mechanism including a base, a pivot housing, and a locking housing that receives the base, wherein the pivot housing defines a pivot axis and wherein the locking housing is configured to lock the frame into at least one of a folded position and an unfolded position;
    a front wheel assembly disposed on the frame and configured to rotate about the pivot axis; and
    a rear wheel assembly disposed on the frame and defining an opening having a diameter larger than an outer diameter of the front wheel assembly,
    wherein the front wheel assembly is disposed within the opening defined by the rear wheel assembly when the bicycle is in a folded position,
    wherein the pivot housing and the base engage the locking housing when the bicycle is in the folded position and in the unfolded position,
    wherein the base defines holes and wherein the locking housing includes pins configured to engage the holes of the base.

13. The foldable bicycle of claim 12, wherein the pivot and locking mechanism includes a shaft disposed on the base and extending from the pivot housing into the locking housing.

14. The foldable bicycle of claim 13, wherein the pivot and locking mechanism includes a spring configured to bias the base toward the locking housing.

15. The foldable bicycle of claim 12, wherein the rear wheel assembly includes a spokeless rear wheel rotatably connected to the frame, wherein the opening is defined by the rear wheel.

* * * * *